Aug. 8, 1933.                A. T. POTTER                 1,921,260
                       WINDSHIELD OPERATING MECHANISM
                            Filed Oct. 4, 1930
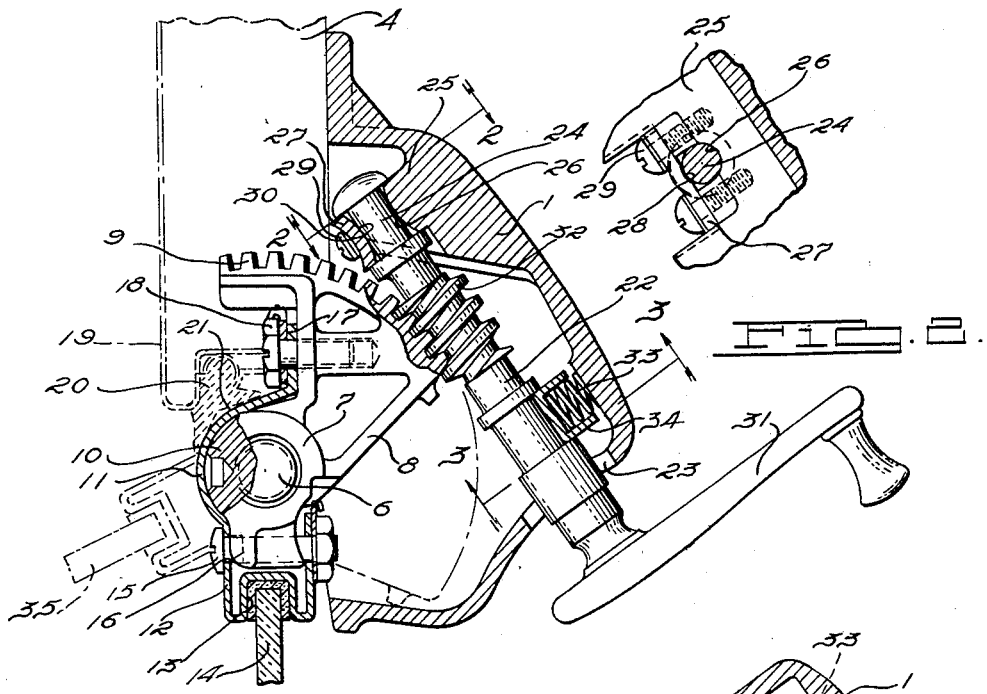
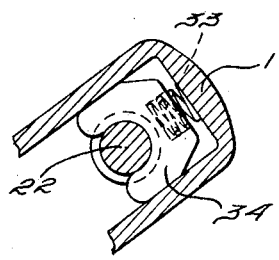
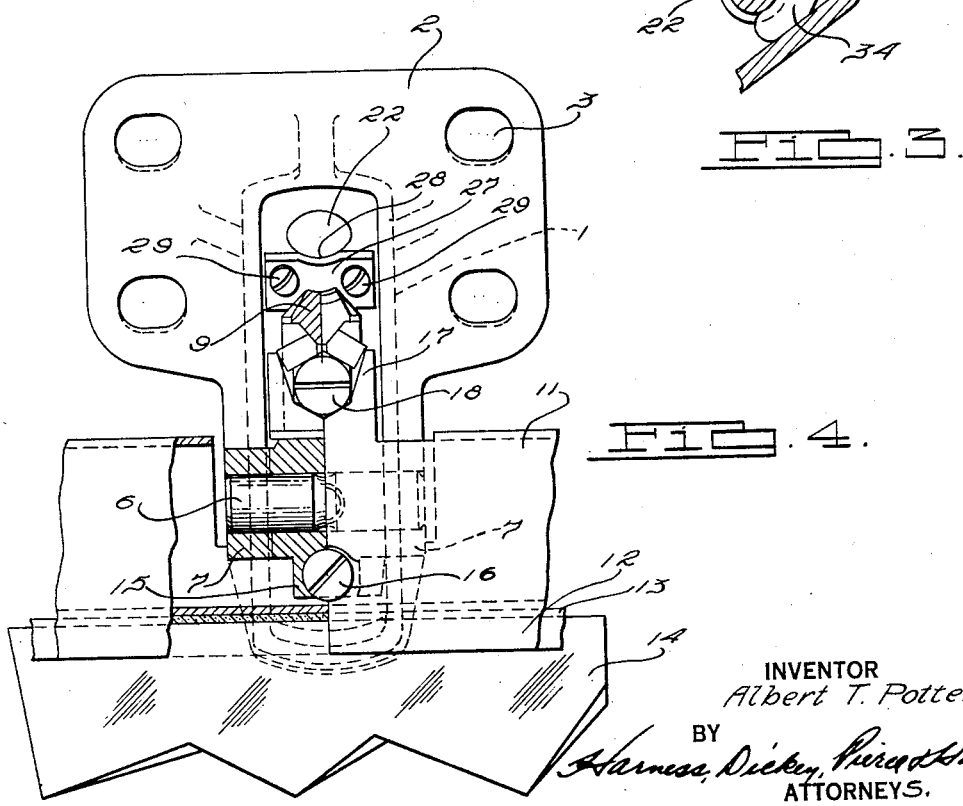
INVENTOR
Albert T. Potter.
BY
Harness, Dickey, Pierce & Hann
ATTORNEYS.

Patented Aug. 8, 1933

1,921,260

UNITED STATES PATENT OFFICE 1,921,260

WINDSHIELD OPERATING MECHANISM

Albert T. Potter, Detroit, Mich., assignor to Ainsworth Manufacturing Corporation, a Corporation of Michigan Application October 4, 1930. Serial No. 486,356

2 Claims. (Cl. 296—84)

This invention relates to improved mechanism for operating vehicle windshields, particularly of the type which are pivotally mounted at one edge.

The main objects of the invention are to provide apparatus of this kind which is operable by a crank; to provide an improved casing which has a sightly appearance for inclosing the mechanism; to provide a swingably mounted driving member which is free at one end to be moved relative to a driven member so as to take up for the wear to which such members are normally subjected; and to provide means for resiliently urging the driving and driven members together, thereby automatically taking up for wear between the interengaged parts and functionally securing such parts against unintended movement so as to retain the windshield in an adjusted position.

Further objects of the invention are to provide improved means for rotatably and swingably supporting one end of the driving member on the casing; to provide means of this kind which are located in close proximity to the engaged parts of the driving and driven members so as to minimize the separating movement which tends to occur between these parts of the members; and to provide a support for the driven member which is located in advance of the engaged parts of the member in the direction in which wind pressure on the windshield normally tends to rotate the driven member so as to prevent relative movement of the driving and driven members by such wind pressure.

An illustrative embodiment of my invention is shown in the accompanying drawing, in which:

Fig. 1 is a vertical sectional view of a windshield operating unit embodying my invention.

Fig. 2 is a transverse sectional view taken on the line 2—2 of Fig. 1.

Fig. 3 is a transverse sectional view taken on the line 3—3 of Fig. 1.

Fig. 4 is a front side elevational view, partly in section, of the windshield operation unit.

In the form shown the windshield operating mechanism includes a housing in which is pivotally mounted a driven member having teeth on one extremity and having means for attachment to a windshield on its other extremity. A rotatable driving member is journaled at its inner end in a bearing in the housing which allows the driven member to swing slightly about its journaled end. Formed on the driving member is a worm thread which is held in mesh with the teeth of the driven member by a spring that bears between the housing and the free end of the driving member so as to take up for wear occurring in the worm thread and teeth and to frictionally hold the parts against unintended movement. The bearing of the driving member is located in advance of the worm thread, in the direction in which the driven member normally tends to rotate under the action of wind pressure on the windshield.

In the illustration shown the housing 1 preferably comprises an integral die formed enclosure having an outwardly extending flange part 2 in which apertures 3 are formed. The housing 1 is mounted on the header bar 4 of a vehicle body by bolts of a conventional design (not shown) which extend through the apertures 3 and it is arranged so that its lower portion extends below the lower edge of the header bar. Pivotally mounted on a pintle 6 which is journaled in hinge element 7 formed in the housing 1 is a worm gear segment 8 having teeth 9 on its outer periphery which is located above the pintle 6.

The segment 8 has a hub 10 located in an arcuate shaped member 11 which extends lengthwise of the header bar 4 along its lower edge. This arcuate shaped member is formed of sheet metal and it has an outwardly extending lower section 12 of rectangular cross section in which is formed a channel 13 for receiving the upper edge portions of a windshield glass 14. The respectively opposite sides of the lower section 12 of the member 11 are drawn together by a bolt 15 which extends through registering apertures in the sides of the rectangular part 12 and through an aperture in a lug 16 which is integral with the hub 10 of the segment 8. Formed on the upper edge of the member 11 is a flange 17 which is rigidly secured to the segment 8 by a bolt 18. The front edge portions of the header bar 4 extend downwardly in spaced overlapping relation to the member 11 and they are covered by a sheet metal sheath 19 on which a rubber weatherstrip 20 is mounted. The rubber strip extends lengthwise of the header bar 4 and has an arcuate surface 21 which engages the outer surface of the member 11, thereby preventing water from entering the passenger compartment of the vehicle between the header bar and the member 11 during all positions of the windshield.

The driving member or shaft 22 extends into the housing 1 through an enlarged opening 23 in which the outer end of the shaft has limited freedom of movement. This shaft has a journal portion 24 at its inner end which is received in a bearing 25 formed in the housing 1. The bearing 25 has a bearing surface or seat 26 which is rounded as illustrated in Fig. 1. A bearing cap 27 having an arcuate depression 28 therein is secured to the bearing by screws 29. The depression 28 forms a rounded bearing surface 30 which engages the periphery of the journal portion 24 of the shaft 22 and holds the same against the rounded bearing surface 26 of the bearing 25. This construction permits the shaft to be rotated about its longitudinal axis by a handle or crank 31 on the external end thereof and also permits the shaft to swing or rock in a pivotal manner upon the rounded bearing surfaces 26 and 30.

Formed on the shaft 22 is a worm thread 32 which is held in mesh with the teeth 9 of the segment by a spring 33 which bears at one end against the housing 1 and at its other end upon a yoke 34 that is seated upon the free end portion of the shaft 22. The spring 33 resiliently urges the shaft 22 toward the segment taking up for wear between the teeth thereof and the worm and frictionally holding these parts against relative movement from adjusted positions.

In operation, rotation of the crank 31 in a clockwise direction turns the segment 8, as viewed in Fig. 1, in a clockwise direction thereby swinging the windshield 14 outwardly from its closed position to an open position, an open position of the windshield being illustrated by dotted lines at 35. Rotation of the crank 31 in a counter clockwise direction swings the windshield 14 to a closed position.

When the windshield is in an open position its weight and the force of wind pressure thereon tends to rotate the segment 8 in a counter clockwise direction. This action causes the inclined faces of the teeth 9 and worm 32 to exert a force upon the shaft 22 which, if unresisted, would move the shaft away from the segment. The bearing 25, however, is located in advance of the contacting portions of the worm and segment in the direction in which the segment tends to rotate under the force of wind pressure and it secures the shaft against movement away from the segment by the wind pressure, thereby preventing the shaft from working and securing the windshield against displacement from an adjusted position.

Although but one specific embodiment of this invention has been herein shown and described, it will be understood that numerous details of the construction shown may be altered or omitted without departure from the spirit of this invention as defined by the following claims.

What I claim is:

1. A windshield operating unit including a housing, a driven member in said housing adapted for attachment to a windshield, a bearing in said housing having a convexed bearing surface, a driving member journaled at one end in said bearing and having a free end extending outwardly through an opening in said housing, a bearing cap secured to said bearing and having a convexed bearing surface seated on said driving member, said driving member being tiltable on said bearing surfaces, means coacting with the free outer end of said driving member for urging the latter towards said driven member, and an operating handle on the external end of said driving member.

2. A windshield operating unit comprising a fixed support adapted to be secured to a vehicle frame, a pivoted worm segment adapted to be secured to a windshield and pivotally secured with respect to the support, a worm having a bearing at one end in the support and engaging the worm gear, the bearing comprising members each having an oppositely disposed radially inwardly convex surface whereby to permit swinging movement of the worm and resilient means urging the worm into engagement with the worm gear.

ALBERT T. POTTER.